3,548,055
INFECTIOUS BURSAL DISEASE VACCINE
Irwin M. Moulthrop, Salisbury, Md., assignor to Research Corporation, New York, N.Y., a non-profit corporation of New York
No Drawing. Continuation-in-part of application Ser. No. 613,128, Feb. 1, 1967. This application May 14, 1969, Ser. No. 824,705
Int. Cl. A61k *23/00;* C12k *5/00, 7/00*
U.S. Cl. 424—89                                                  5 Claims

ABSTRACT OF THE DISCLOSURE

An egg propagated vaccine for infectious bursal disease is made by passing the causative virus through embryonating eggs.

---

This application is a continuation-in-part of my application Ser. No. 613,128, filed Feb. 1, 1967, now abandoned.

This invention relates to a vaccine for infectious bursal disease, heretofore designated "Gumboro disease," an infectious disease of poultry. The causative agent of the disease is a virus which has been isolated from the bursa of Fabricius, liver, kidneys and other organs of infected birds. The disease, which usually appears in young chicks at about three to four weeks of age, has become widespread in the Delmarva Peninsula and has resulted in severe economic losses to the poultry producer.

Some work has been done on developing a vaccine for infectious bursal disease using material from live birds. However, an egg propagated vaccine would be more desirable since the possibility of contamination with other disease-causing organisms is much less than with vaccine derived from live birds.

It is, therefore, a principal object of the present invention to provide an egg propagated vaccine for infectious bursal disease.

It is a further object of the invention to provide a method for the management of infectious bursal disease using an egg propagated vaccine.

The egg propagated vaccine of my invention is prepared by inoculating the causative virus into embryonating eggs in the sixth to tenth day of incubation, extract from the embryos dying on the third to sixth day following initial inoculation is inoculated into six to ten-day embryonating eggs and the cultivation procedure repeated for at least eight times until the virulence of the causative agent is diminished, extract from the embryos containing the causative agent of diminished virulence is inoculated into six to ten-day embryonating eggs, and the embryos dying on the third to sixth day following the final inoculation are blended with an aqueous medium followed by filtration to remove coarse particles.

Any disease-causing strain of the causative virus may be employed to inoculate the embryonating eggs and initiate vaccine preparation. While an aqueous extract of an organ taken from an infected bird is preferred, other sources of the causative virus such as cultures of the virus growing on natural or living media may be utilized. Generally speaking, the strain selected for vaccine preparation is isolated from a flock with a high morbidity but low mortality of infectious bursal disease.

The following example is illustrative of my invention:

The causative virus (strain S 40747) was isolated from the bursa of Fabricius of infected birds by grinding with 5 ml. of sterile broth and chilling until the larger particles had separated. The supernatant fluid was filtered to remove bacteria; the absence of bacteria and *M. gallisepticum* was confirmed by culture of an aliquot sample. The virus was cultivated by orally feeding 0.2 ml. of the supernatant fluid to three week old chicks kept in isolation since hatching. Lesions were observed on the fourth day after feeding in eleven successive chick passages.

The vaccine was prepared by inoculating 0.2 ml. portions of the contamination-free supernatant fluid isolated from the bursa of Fabricius after the eleventh passage into embryonating eggs in the tenth day of incubation via the allantoic cavity. Embryos dying on the first to third days following inoculation were discarded. Embryos dying on the third to sixth day following inoculation showed an edema of the head and a reddening of the embryo typical of the condition.

Extracts from the embryos dying on the third to sixth day were inoculated into the allantoic cavity of embryonating eggs on the tenth day of incubation as before. Seven further passages were made using extracts from embryos dying on the third to sixth days as the inoculum. The eighth passage material titered to 3.25 per ml. in susceptible eggs and 4.25 per ml. in susceptible chicks. Material from each passage produced typical lesions in susceptible chicks but after the eighth passage the lesions were mild.

A final embryonating egg passage was made to prepare the vaccine. The embryos dying on the third to sixth day were chilled at 4° C. and then separated from the membranes, yolk and fluids. The separated embryos were blended at high speeds for two minutes in a Waring Blendor with 5.0 ml. of sterile nutrient broth containing 0.1 mg. dihydrostreptomycin and 100 units of penicillin per embryo. After blending (5–15 embryos per jar are preferred) the vaccine was filtered through sterile gauze and packaged and preserved by freezing. Each batch of vaccine was cultured to test for possible bacterial contamination, titered in eggs and tested on live birds prior to field use.

Vaccine from the ninth passage prepared as above was used to vaccinate birds from 4 to 14 days of age. Each 1000 chicks received 4 ml. of the vaccine in 1 gallon of drinking water for 1 hour. The vaccinated birds demonstrated complete immunity when challenged at various intervals up to 12 weeks of age. Each bird was challenged with 1 drop of a virulent isolate administered ocularly. Adequate controls were used and developed lesions typical of the disease.

The vaccine was further tested in 15 commercial broiler flocks. Each flock was divided into a vaccinated group and a control group, housed separately. A total of 249,000 birds were vaccinated and 146,000 unvaccinated served as controls. The control groups exhibited a mortality four to five times greater than that in the groups vaccinated against infectious bursal disease. The incidence of mortality from the disease in the vaccinated groups was almost negligible.

Other variations in preparing and using the egg propagated vaccine of my invention and falling within the scope of my invention will suggest themselves to those skilled in the art.

I claim:
1. A method for the preparation of an egg propagated vaccine for infectious bursal disease which comprises: inoculating the causative virus of infectious bursal disease into embryonating eggs on the sixth to tenth day of incubation, inoculating an extract from the embryos dying on the third to sixth day following initial inoculation into six to ten-day embryonating eggs and repeating the cultivation procedure for at least eight times until the virulence of the causative virus is diminished, inoculating an extract from the embryos containing the virus of diminished virulence into six to ten-day embryonating eggs, and blending the embryos dying on the third to sixth day following the final inoculation with an aqueous solution followed by filtration to remove coarse particles.

2. A method according to claim 1 wherein the embryonating eggs are initially inoculated with an aqueous extract of an organ of a bird infected with infectious bursal disease.

3. A method according to claim 2 wherein the organ is the bursa of Fabricius.

4. The vaccine made by the method of claim 1.

5. A method for controlling infectious bursal disease of poultry which comprises administering to susceptible birds an egg propagated vaccine prepared by inoculating the causative virus of infectious bursal disease into embryonating eggs on the sixth to tenth day of incubation, inoculating an extract from the embryos dying on the third to sixth day following initial inoculation into six to ten-day embryonated eggs and repeating the cultivation procedure for at least eight times until the virulence of the causative virus is diminished, inoculating an extract from the embryos containing the causative virus of diminished virulence into six to ten-day embryonating eggs, blending the embryos dying on the third to sixth day following the final inoculation with an aqueous solution followed by filtration to remove coarse particles.

References Cited

Parkhurst, R. T.: World's Poultry Sci. J., 20(3):208–211, July–September 1964.

Hemboldt, C. F., et al.: Avian Dis., 8(4):561–575, November 1964.

SHEP K. ROSE, Primary Examiner

U.S. Cl. X.R.

115—1.3, 1.5